Patented Mar. 30, 1926.

1,578,521

UNITED STATES PATENT OFFICE.

EDWARD C. HOLTON, OF OLMSTED FALLS, OHIO, ASSIGNOR TO THE SHERWIN-WILLIAMS COMPANY, OF CLEVELAND, OHIO, A CORPORATION OF OHIO.

INSECTICIDE-FUNGICIDE AND PROCESS FOR MAKING THE SAME.

No Drawing.   Application filed March 8, 1924.   Serial No. 697,713.

*To all whom it may concern:*

Be it known that I, EDWARD C. HOLTON, a citizen of the United States, and a resident of Olmsted Falls, county of Cuyahoga, State of Ohio, have invented certain new and useful Improvements in Insecticide-Fungicide and Processes for Making the Same, of which the following is a specification.

This invention relates to products intended for use as a fungicide-insecticide, and to the process for making same.

From the earliest days of horticulture sulfur has been used as an insectifuge, insecticide and fungicide and, during recent years, its use has been greatly extended. It is well known that a finely divided sulfur is more efficient for these purposes than the coarser forms and, therefore, various methods have heretofore been devised to produce the finely divided sulfur. This has been accomplished by dry-grinding in impact mills and ball mills, as well as mills of other types; also by wet-grinding in the same, as well as by sublimation.

Very finely divided sulfur has also been prepared by chemical methods such as by the reaction between sulfur dioxide and hydrogen sulfide, which reaction may be represented as follows:

$$SO_2 + 2H_2S = 2H_2O + 3S$$

The above reaction may occur either in the gaseous phase or, better still, aqueous solutions.

Another common method of preparing finely divided sulfur is to decompose a polysulfid in aqueous solution, with an acid in aqueous solution, selection being made both as to the base and acid, so that the salt formed shall be soluble in water and the precipitated sulfur may be separated from the solution by the usual methods of filtration or centrifuging, and washing, etc.

If a polysulfid of an alkali such as sodium polysulfid or potassium polysulfid, is used, sulfuric or hydrochloric acids are the precipitants commonly employed, although some other acids may be used, provided the sodium or potassium salts that are formed are soluble in water so that they may be washed away. These reactions may be represented thus:

$$Na_2S_x + 2HCl = 2NaCl + H_2S + (x-1)S$$
$$K_2S_x + H_2SO_4 = K_2SO_4 + H_2S + (x-1)S$$

If, instead of using a polysulfid of an alkali, a polysulfid of an element of the alkaline earths group, such as calcium polysulfid or barium polysulfid, is used, a number of different acids may be used as precipitants but sulfuric acid should not be used if it is desired to produce a pure sulfur, because the sulfates of the elements of the alkaline earths group are insoluble or but slightly soluble in water, and hence will be coprecipitated with the sulfur and cannot be economically separated therefrom.

It has been found that the sulfates of the elements of the alkaline earths group are practically worthless as insecticides and fungicides, but a sulfur coprecipitated with these is, nevertheless, of somewhat greater value for these purposes, than if it were mixed with an equal volume of other inert mineral matter. The reactions which form these sulfates may be represented thus:

$$CaS_x + H_2SO_4 = CaSO_4 + H_2S + (x-1)S$$
$$BaS_x + H_2SO_4 = BaSO_4 + H_2S + (x-1)S$$

If hydrochloric acid is used with a polysulfid of an element of the alkaline earths group, the reactions with calcium, strontium and barium polysulfids may be represented thus:

$$CaS_x + 2HCl = CaCl_2 + H_2 + (x-1)S$$
$$SrS_x + 2HCl = SrCl_2 + H_2S + (x-1)S$$
$$BaS_x + 2HCl = BaCl_2 + H_2S + (x-1)S$$

Since the calcium chloride, strontium chloride and barium chloride produced by the above reactions, are soluble in water, the sulfur may be removed in a state of purity as in the case of the polysulfids of the alkalies.

If desired, the chlorides of the elements of the alkaline earths group, may be recovered from the solution by processes of evaporation, crystallization, etc. The substantially pure sulfur obtained is in a finely divided state and when kept in a wet condition is a very reactive substance and a very efficient insecticide-fungicide. However, when this sulfur is once dried it is rather troublesome to completely disintegrate the aggregated particles and thus make it suitable for dusting, alone, or in dry mixtures, and at the same time have it possess the property of being readily wettable with water.

When used in wet sprays it is very desirable that the sulfur should be readily wettable with water and this may be accomplished by some such method as is disclosed in my patent application, Serial No. 565,434, wherein there is disclosed the use of bentonite for this purpose.

If the active form of sulfur, above referred to, is prepared by the reaction of sulfuric acid on a polysulfid of an element of the alkaline earths group, there is coprecipitated with the sulfur, as has already been stated, a sulfate of an element of the alkaline earths group and, although these sulfates are practically worthless as insecticides and fungicides and must be classed as "inerts" under the existing Federal insecticide law, yet they do possess some merit in the mixture since they tend to keep the sulfur particles somewhat dispersed and in a more reactive condition, and the coprecipitate, after being dried, is more easily wettable than sulfur alone. Insecticides and fungicides, generally, are more easily handled in commerce in the dry powdered form and it is an object of this invention to produce a product that may be thus handled and still be readily wettable with water.

It is a further object of my invention to provide a mixture of fungicidal and insecticidal sulfur and an insoluble or but slightly soluble toxic compound of an element of the alkaline earths group in which the sulfur is maintained in its highly reactive state and is readily wettable with water. It is a further object of the invention to provide a process for manufacturing this product on a commercial scale by forming the mixture as a coprecipitate resulting from the reaction of a suitable acid substance on a polysulfid of an element of the alkaline earths group.

My invention is not limited to the use of the polysulfid of any particular element of the alkaline earths group, nor to any single acid substance, but relates, broadly, to the coprecipitation, with the sulfur, of insoluble or but slightly soluble compounds possessing fungicidal and insecticidal properties, which may be classed as more than 95% active under the existing Federal insecticide law. As illustrations of a few of the possible applications of my invention, the following are given:

Using the letter E to represent an element of the alkaline earths group and the letter x to represent a number greater than one, but not greater than five, the reactions may be written thus $$ES_x + H_2SeO_3 = ESeO_3 + (x-1)S + H_2S$$
$$ES_x + H_2SeO_4 = ESeO_4 + (x-1)S + H_2S$$
$$3ES_x + 2H_3AsO_4 = E_3As_2O_8 + (x-1)S + H_2S$$
$$ES_x + 2CaHAsO_4 = Ca_2EAs_2O_8 + (x-1)S + H_2S$$
$$ES_x + 2HF = EF_2 + (x-1)S + H_2S$$

In the typical reactions just given, it will be noted that there is a development of hydrogen sulfid. It is desirable that the sulfur in this hydrogen sulfid be utilized, and preferably in insecticidal compositions. To accomplish this it may be brought directly into contact with sulfur dioxide or sulfites and thiosulfates of the elements of the alkaline earths group, as illustrated in the following reactions. These reactions may take place in steps, separately or all together, almost simultaneously, the final result being that practically all of the sulfur is recovered in the desired form. These reactions may be considered as types to illustrate this:

$$ES_x + H_2SeO_4 = ESeO_4 + H_2S + (x-1)S$$
$$2ES_x + 3SO_2 = 2ES_2O_3 + (2x-1)S$$
$$ES_2O_3 + 2H_2S + H_2SeO_4 = ESeO_4 + 3H_2O + 4S$$

The combined reactions may be written
$$2ES_x + SO_2 + 2H_2SsO_4 = 2ESeO_4 + 2H_2O(2x+1)S$$

These reactions are cited merely as representative of some of the reactions which take place when a polysulfid of an element of the alkaline earths group is reacted upon selenic acid, together with sufficient sulfur dioxide, or compounds of the alkaline earths group, which yield sulfur dioxide, to precipitate practically all of the sulfur.

As further illustrating the application of my invention the following reactions are given:

$$2H_3AsO_4 + 3ES_x = E_3As_2O_8 + 3H_2S + 3(x-1)S$$
$$2CaHAsO_4 + ES_x = CaEAs_2O_8 + H_2S + (x-1)S$$
$$H_2C_2O_4 + ES_x = EC_2O_4 + H_2S + (x-1)S$$

In these reactions hydrogen sulfide is liberated but the sulfur therein may be recovered as already described.

In practising my invention the chemicals are brought together in solution in proper proportion to carry out the reactions stated and the coprecipitate of sulfur and the compound of the element of the alkaline earths group is separated from the water by the usual processes of filtration or centrifuging and drying. After drying the coprecipitate is reduced to a fine powder suitable for using either in sprays or for dusting purposes.

In the foregoing disclosure of my invention I have illustrated various methods of accomplishing the desired results but it will be understood that the invention is not limited to these typical illustrations.

In the appended claims I have used the term "substantially insoluble" and it will be understood that this is intended to refer to the condition of insolubility or but slight solubility referred to hereinabove.

Having thus described my invention, what I claim is:

1. In methods for the production of a product for the purposes specified, the step which consists in reacting upon a polysulfid of an element of the alkaline earths group with a suitable acid substance for producing a coprecipitate of finely divided sulfur and a substantially insoluble toxic substance.

2. In methods for the production of a product for the purposes specified, the step which consists in reacting upon a polysulfid of an element of the alkaline earths group with a suitable acid substance for producing hydrogen sulfid and a coprecipitate of finely divided sulfur and a substantially insoluble toxic substance, and reacting upon the hydrogen sulfid with another sulfur compound to form an additional amount of finely divided sulfur.

3. In methods for the production of a product for the purposes specified, the step which consists in reacting upon a polysulfid of an element of the alkaline earths group with a suitable acid substance for producing hydrogen sulfid and a coprecipitate of finely divided sulfur and a substantially insoluble toxic substance, and reacting upon the hydrogen sulfid with sulfur dioxide to form an additional amount of finely divided sulfur.

4. In methods for the production of a product for the purposes specified, the step which consists in forming a coprecipitate of finely divided sulfur and a substantially insoluble toxic substance by bringing together in solution a polysulfid of an element of the alkaline earths group, sulfur dioxide and an acid substance capable of reacting on said polysulfid to form said toxic substance.

5. In methods for the production of a product for the purposes specified, the step in which an acid capable of forming a substantially insoluble toxic compound of an element of the alkaline earths group reacts with a sulfite or thiosulfate of an element of the alkaline earths group in admixture with a polysulfid of an element of the alkaline earths group to form a coprecipitate of sulfur and said toxic compound.

6. As a new product or article of manufacture, a co-precipitate of finely divided sulfur and a substantially insoluble compound of an element of the alkaline earths group.

7. As a new product or article of manufacture, for the purposes specified, a dry powder consisting of a co-precipitate of sulfur and a substantially insoluble insecticidal toxic compound of an element of the alkaline earths group.

8. As a new product or article of manufacture, for the purposes specified, a dry powder of which the minor part consists of chemically precipitated sulfur and the major part consists of a substantially insoluble compound of an element of the alkaline earths group co-precipitated with the sulfur.

In testimony whereof I affix my signature.

EDWARD C. HOLTON.